US007404257B2

(12) United States Patent
Hung et al.

(10) Patent No.: US 7,404,257 B2
(45) Date of Patent: Jul. 29, 2008

(54) TEMPLATE FOR ASSISTING COVER DESIGN

(75) Inventors: Sheng-Feng Hung, Taipei Hsien (TW); Tzu-Cheng Yu, Santa Clara, CA (US); Yu-Chuan Liang, Taipei Hsien (TW); Chao Liu, Shenzhen (CN); Hong-Xiu Luo, Shenzhen (CN)

(73) Assignees: Shenzhen Futaihong Precision Industry Co., Ltd., ShenZhen, Guangdong Province (CN); Sutech Trading Limited, Tortola (VG)

( * ) Notice: Subject to any disclaimer, the term of this patent is extended or adjusted under 35 U.S.C. 154(b) by 0 days.

(21) Appl. No.: 11/611,451

(22) Filed: Dec. 15, 2006

(65) Prior Publication Data

US 2007/0240323 A1 Oct. 18, 2007

(30) Foreign Application Priority Data

Apr. 14, 2006 (CN) ........................ 2006 1 0060307

(51) Int. Cl.
*G01B 5/28* (2006.01)

(52) U.S. Cl. ........................................... 33/562; 73/105

(58) Field of Classification Search .................. 33/562, 33/563, 565, 566, 567, DIG. 11; 73/105; D10/64
See application file for complete search history.

(56) References Cited

U.S. PATENT DOCUMENTS

| | | | | | |
|---|---|---|---|---|---|
| 2,715,830 | A * | 8/1955 | Lewis et al. | .................. | 73/1.89 |
| 3,505,861 | A * | 4/1970 | Schoefer et al. | ............... | 73/105 |
| 4,141,239 | A * | 2/1979 | Gilbert | .......................... | 73/81 |
| 4,945,642 | A * | 8/1990 | Saulietis | ..................... | 33/17 R |
| 5,577,328 | A * | 11/1996 | Kerry, Sr. | .................... | 33/563 |
| 5,604,988 | A * | 2/1997 | Costelloe | ..................... | 33/501 |
| 5,987,760 | A * | 11/1999 | Hsu | .......................... | 33/27.03 |
| 6,216,354 | B1 * | 4/2001 | Carbone | ...................... | 33/565 |
| 6,321,457 | B1 * | 11/2001 | Lariviere et al. | .............. | 33/562 |
| 2002/0009695 | A1 * | 1/2002 | Rasheed et al. | ............... | 434/85 |
| 2003/0118689 | A1 * | 6/2003 | Carlson et al. | .............. | 425/811 |

* cited by examiner

*Primary Examiner*—R. A. Smith

(57) ABSTRACT

A template (10) for assisting cover design has a decorative surface (12). The decorative surface includes a curved portion (121) and an essentially flat portion (122) around the curved portion. The flat portion has a plurality of slots (124) formed therein and is divided into several sections by the slots. Each section has been processed to have a characteristic texture. Each texture within a given section is different from that of any other one of the sections.

14 Claims, 2 Drawing Sheets

TEMPLATE FOR ASSISTING COVER DESIGN

BACKGROUND OF THE INVENTION

1. Field of the Invention

The present invention relates generally to templates for assisting cover design and, more particularly, to a template for assisting cover design in a surface treatment process.

2. Discussion of the Related Art

Various surface treatment technologies, such as spray painting, electronic plating, physical vacuum deposition, anodizing, and electrophoresis plating, are used to manufacture high-quality covers for mobile devices. The decorative appearance of any surface treatment process may vary with the shape of the covers. Designers would like to know the difference in appearance between different shaped covers after surface treatment, in order to choose a desired shape with a desired appearance. Typically, the designers prepare several sample covers with different shapes, each of which has been processed with a particular surface treatment. Thus, designers can compare the decorative appearances of the covers in order to choose a desired shape and surface treatment combination. However, each conventional sample only shows one decorative appearance of covers in a same shape. It is time-consuming and costly to prepare samples of covers in varying shapes.

What is needed, therefore, is a template for assisting cover design, which can show various decorative appearances of covers processed via a surface treatment in varying shapes.

SUMMARY OF THE INVENTION

In one embodiment thereof, a template for assisting cover design is provided. The template for assisting cover design has a decorative surface. The decorative surface includes a curved portion and an essentially flat portion around the curved portion. The flat portion has several slots formed therein and is divided into several sections by the slots. Each section has been processed to display a texture. Each respective texture is unique to a given one of the sections.

Other advantages and novel features will become more apparent from the following detailed description of preferred embodiments when taken in conjunction with the accompanying drawings.

BRIEF DESCRIPTION OF THE DRAWINGS

Many aspects of the template for assisting cover design can be better understood with reference to the following drawings. The components in the drawings are not necessarily drawn to scale, the emphasis instead being placed upon clearly illustrating the principles of the template for assisting cover design. Moreover, in the drawings like reference numerals designate corresponding parts throughout the several views.

DETAILED DESCRIPTION OF THE PREFERRED EMBODIMENTS

Figure 1:
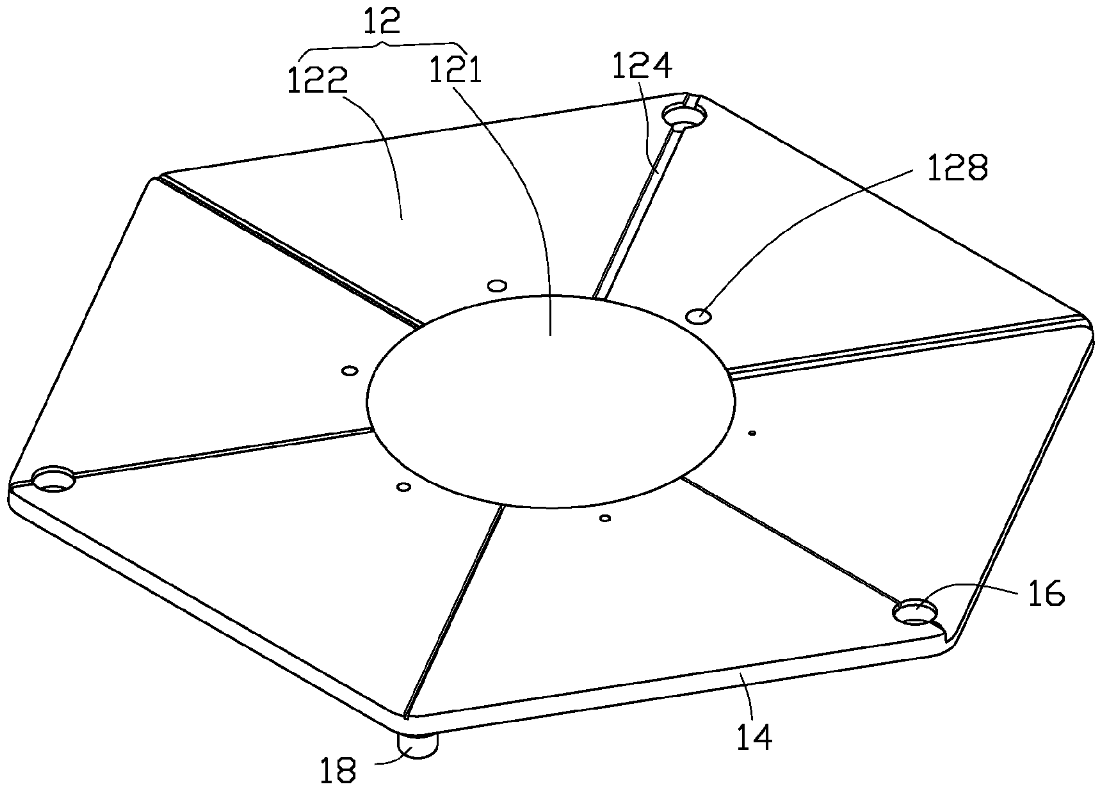
FIG. 1 is a schematic view of a preferred embodiment of a template for assisting cover design.
Figure 2:
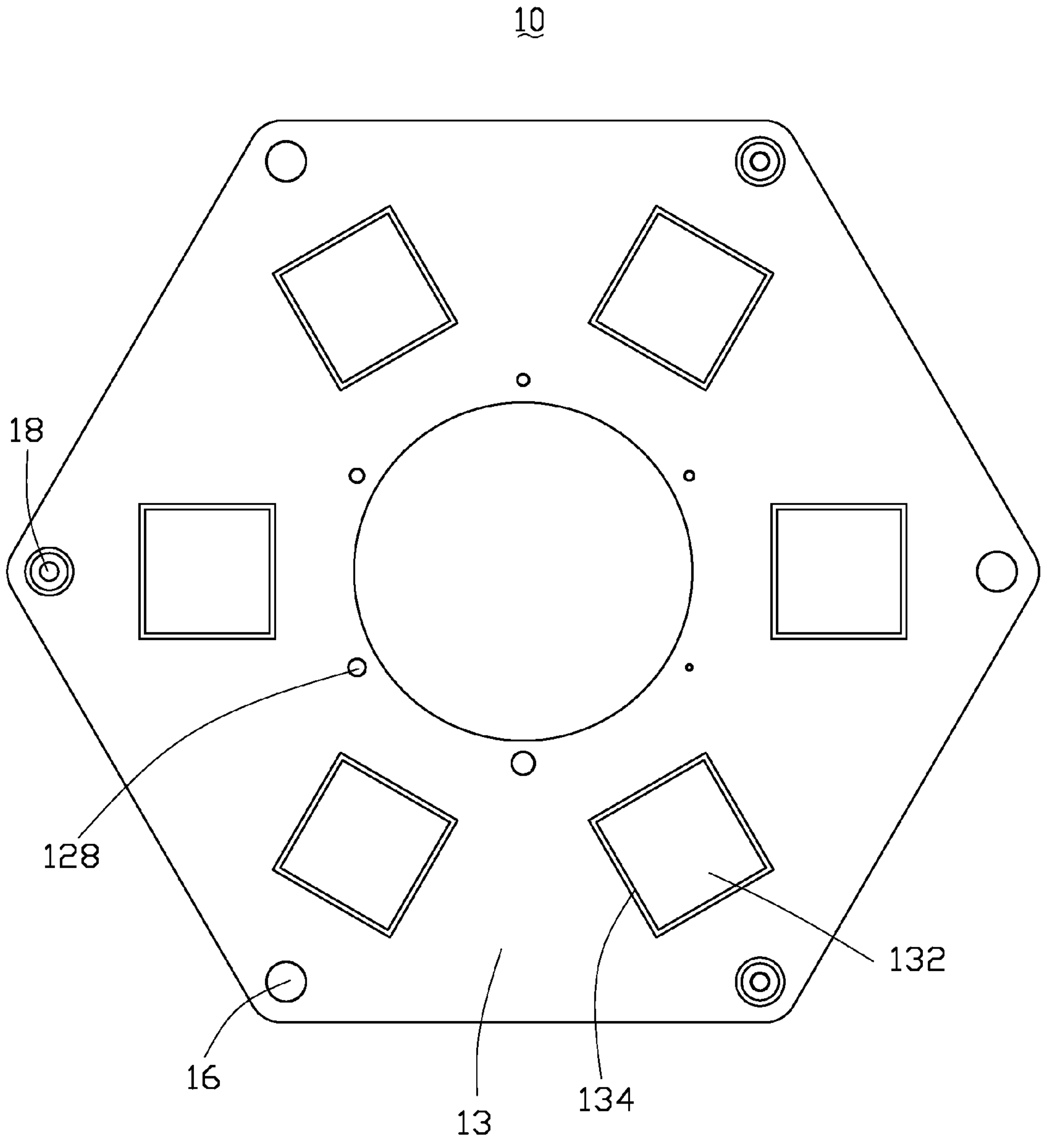
FIG. 2 is a bottom plan view of the template in FIG. 1.

Referring to FIG. 1 and FIG. 2, in a preferred embodiment, a template 10 for assisting cover design is a hexagonal board. The template 100 is provided with a decorative surface 12, a back surface 13 opposite to the decorative surface 12, and six side surfaces 14. It is, of course, to be understood that the template 10 could be another polygonal shape or even some other shape (e.g., oval, circle) and still be within the scope of the present template.

The decorative surface 12 includes an essentially flat portion 121 and a curved portion 122 defined in the center of the flat portion 121. The curved portion 122 can be, e.g., a spherical convex surface or a spherical concave surface. The curved portion 122 could instead be aspherical.

The flat portion 121 has six slots 124 defined therein, the depth of which is less than the thickness of the template 10 (i.e., the slots 124 are not through-slots). Each slot 124 extends from an outer edge of the decorative surface 12 to a fringe around the curved portion 122 and preferably extends from a corresponding corner of the decorative surface 12 to a fringe around the curved portion 122, along a radial direction (e.g., a diagonal direction, if at an angle to vertical/horizontal) of the decorative surface 12. Each respective slot 124 has a width different from that of any other slot, such width being in an approximate range from 0.1 mm to 0.5 mm. Thus, the flat portion 121 is divided into six sections by the slots 124. Each section has been respectively processed via a corresponding surface treatment process to form a particular texture. The particular texture of a given section is different from that of any of the other sections, in depth and/or in the treatment process used to form it. Each section has a circular hole 128 formed therein. Each circular hole 128 has a diameter different from that of any other circular hole. Each section and its corresponding side surface 14 define a semi-circular edge. Each semi-circular edge has a size different from any other semi-circular edge.

The decorative surface 12 has three positioning holes 16 defined therein. The positioning holes 16 are arranged in, e.g., a first triangle, which is concentric with the decorative surface 12. Each positioning hole 16 is located in a corresponding slot 124 and positioned adjacent to a corresponding corner of the template 10.

The back surface 13 has several affixing/attachment sections 132. Each affixing section 132 has a frame-shaped projection 134 formed around it. The affixing sections 132 can, for example, be coated with adhesive or have magnetic elements mounted thereon. Thus, the template 10 can be affixed to a desk or a demonstration board (neither of which is shown).

The back surface 13 further has three positioning pins 18 disposed thereon. The positioning pins 18 are arranged in a second triangle corresponding to the positioning holes 16. The second triangle is matingly aligned with the first triangle. When several templates 10 are stacked together, the positioning pins 18 of one template 10 are able to be inserted into corresponding positioning holes 16 of any other one template 10, ensuring a desired template set alignment. Other numbers of positioning pins 13 and corresponding positioning holes 16 could be used, so long as these also are equal in number and matingly aligned.

The decorative surface 12 of the template 10 can be further processed via, e.g., spray painting, electronic plating, physical vacuum deposition, anodizing, or electrophoresis plating. Thus, after being processed via one of those surface treatment technologies, decorative appearances of the decorative surface 10 in varying texture surfaces, semi-circular edges, slots, and/or holes can be shown. Designers can choose desired shapes and surface characteristics for covers for mobile devices, based upon a comparison between the decorative appearances of the various sections on the decorative surface 10, each of which with varying combination of texture surfaces, semi-circular edges, slots, and/or holes. Designers also can choose a desired surface treatment process for covers for mobile devices according to comparison between the decorative appearances of the decorative surface 10 processed via varying surface treatment technologies. It is further understood that multiple decorative surfaces 10 could be prepared to provide a greater number of textures and/or layouts to choose from.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A template for assisting cover design, comprising:

a decorative surface including a curved portion and an essentially flat portion around the curved portion;

wherein the flat portion has a plurality of slots formed therein, the flat portion is divided into several sections by the slots, and each respective section has a corresponding texture, the texture of a given section being different from the texture associated with any other one of the sections.

2. The template as claimed in claim 1, wherein the template is a hexagonal board.

3. The template as claimed in claim 1, wherein each respective slot extends from an outer edge of the decorative surface to a fringe around the curved portion, along a radial direction of the decorative surface.

4. The template as claimed in claim 1, wherein each respective slot extends from a corresponding corner of the decorative surface to a fringe around the curved portion, along a radial direction of the decorative surface.

5. The template as claimed in claim 1, wherein each slot has a width different from that of any other slot, each slot having a width in an approximate range from 0.1 mm to 0.5 mm.

6. The template as claimed in claim 1, wherein the template has a plurality of side surfaces, each side surface and a corresponding section of the flat portion defining a semi-circular edge.

7. The template as claimed in claim 6, wherein each semi-circular edge is different in size from any other semi-circular edge.

8. The template as claimed in claim 1, wherein the curved portion is one of convex and concave.

9. The template as claimed in claim 8, wherein the curved portion is a spherical surface.

10. The template as claimed in claim 1, wherein each respective section has a corresponding circular hole formed therein.

11. The template as claimed in claim 10, wherein each circular hole has a diameter different from that of any other circular hole.

12. The template as claimed in claim 1, wherein the template has a back surface opposite to the decorative surface, the back surface has a plurality of affixing sections, and each affixing section has a frame-shaped projection formed around it.

13. The template as claimed in claim 12, wherein the affixing sections are configured for at least one of adhesively and magnetically attaching to another object.

14. The template as claimed in claim 12, wherein the decorative surface has a first plurality of positioning holes defined therein, the positioning holes are arranged in a first shape, the first shape is aligned with the decorative surface, the back surface has a second plurality of positioning pins arranged in a second shape, the second shape is matingly aligned with the first shape.

* * * * *